United States Patent [19]

Varghese et al.

[11] Patent Number: 4,988,014

[45] Date of Patent: Jan. 29, 1991

[54] METHOD AND APPARATUS FOR STORING CRYOGENIC FLUIDS

[75] Inventors: Alexander P. Varghese, Bethlehem; Robert H. Herring, New Tripoli, both of Pa.

[73] Assignee: Air Products and Chemicals, Inc., Allentown, Pa.

[21] Appl. No.: 389,705

[22] Filed: Aug. 3, 1989

Related U.S. Application Data

[63] Continuation-in-part of Ser. No. 152,278, Feb. 4, 1989.

[51] Int. Cl.$^5$ .............................................. F17C 7/02
[52] U.S. Cl. .................................... 220/469; 220/901; 62/55.5
[58] Field of Search ............... 220/469, 466, 420, 421, 220/901; 62/55.5

[56] References Cited

U.S. PATENT DOCUMENTS

| | | | |
|---|---|---|---|
| 2,314,598 | 3/1943 | Phelan | 62/114 |
| 3,698,200 | 10/1972 | Johnson et al. | 220/421 X |
| 3,705,498 | 12/1972 | DeHaan | 220/421 X |
| 3,780,900 | 12/1973 | Yamamoto | 220/92 G |
| 3,782,128 | 1/1974 | Hampton et al. | 62/51 |
| 3,895,497 | 7/1975 | McIntosh et al. | 62/45 |
| 3,930,375 | 1/1976 | Hofmann | 220/421 X |
| 3,942,331 | 3/1976 | Newman, Jr. et al. | 220/421 X |
| 3,952,531 | 4/1976 | Turner | 62/45 |
| 4,027,379 | 6/1977 | Cheng et al. | 220/421 X |
| 4,154,363 | 5/1979 | Barthel | 220/421 |
| 4,287,720 | 9/1981 | Barthel | 62/45.1 |
| 4,364,235 | 12/1982 | Hemmerich | 62/55.5 |
| 4,394,929 | 7/1983 | Patel et al. | 220/421 |
| 4,498,304 | 2/1985 | Guilhem | 220/421 X |
| 4,548,335 | 10/1985 | Remes et al. | 220/466 |
| 4,674,289 | 6/1987 | Andonian | 62/45 |
| 4,796,432 | 1/1989 | Fixsen et al. | 62/51.3 |

FOREIGN PATENT DOCUMENTS 2361360 6/1974 Fed. Rep. of Germany ...... 220/901

Primary Examiner—Joseph M. Moy
Attorney, Agent, or Firm—James C. Simmons; William E. Marsh

[57] ABSTRACT

Method and apparatus for preventing loss of liquid cryogen due to heat infiltration into the cryogen stored in a dewar. At least one transient heat shield disposed in the vacuum space between the inner and outer vessels of the dewar in heat exchange with normal cryogenic liquid, cold gas, or supercritical fluid withdrawal means of the stored cryogen, intercepts heat transfer into the stored cryogen.

12 Claims, 2 Drawing Sheets

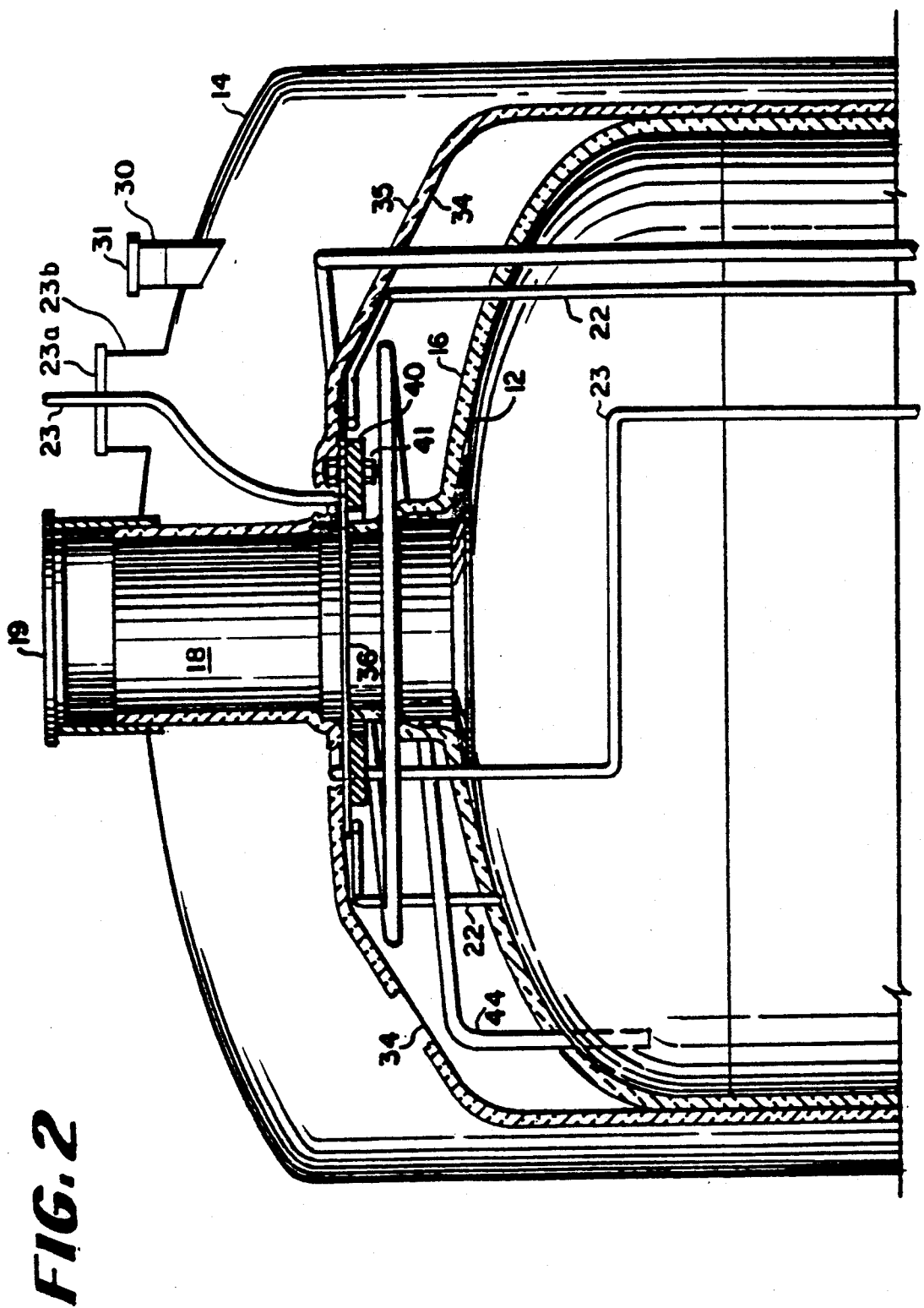

METHOD AND APPARATUS FOR STORING CRYOGENIC FLUIDS

RELATED APPLICATION

This application is a Continuation-in-part of U.S. patent application Ser. No. 07/152,278 filed Feb. 4, 1989.

FIELD OF THE INVENTION

This invention pertains to cryogenic transportation or storage dewars, tanks or containers of the vacuum-jacketed type suitable for transporting or storing cryogenic fluids such as liquid hydrogen or liquid helium. Storage dewars at a user location are subject to withdrawal of the liquid cryogen according to the needs of the user.

BACKGROUND OF THE INVENTION

Transportation, storage and/or distribution of industrial gases such as oxygen, nitrogen, helium, hydrogen, argon, neon and the like with atmospheric pressure condensation temperatures in the cryogenic range, e.g. below $-130°$ F. ($-90°$ C.) becomes most economical when the gases are maintained in the liquid phase. In the ordinary course of liquefying the gases, large quantities of refrigeration are necessary. When the liquid is brought to a user's location and placed in a cryogenic storage dewar, the liquid is generally converted to a gas for use by the customer thus releasing refrigeration. Conventional storage dewars dump the refrigeration produced by vaporation of the stored cryogen to the atmosphere.

In the case of long term storage of cryogen on a customer site there is the possibility, if the withdrawal rate is not very large, that due to infiltration of heat, stored cryogen will be vaporized inside the dewar and the vapor vented to the atmosphere, thus causing loss of cryogen available for use by the user (customer). For example, when liquid hydrogen is stored in a conventional 1500 gallon cryogenic dewar comprising an inner vessel and an outer vessel with a vacuum space between the inner and outer vessel and the vacuum space containing a conventional multi-layer insulation, in order to prevent loss of stored cryogen by venting, the user must draw off a minimum of approximately 80,000 ft$^3$ per month of vapor in order to utilize all of the delivered cryogen.

One approach to maintaining liquid inventory and prevent venting of vaporized cryogen inside the tank is disclosed and claimed in U.S. Pat. No. 3,698,200. Patentees' invention relies upon a heavy radiation shield disposed between the inner and outer vessel which is cooled by the product as the inner vessel is filled. This technique is used in combination with the conventional multi-layer insulation, vacuum jacketing, and a liquid nitrogen reservoir inside the tank and is particularly adapted for storage of liquefied helium which vaporizes at approximately 4° K.

Precooling of the radiation shield according to Patentees is accomplished by allowing a portion of the fluid stored inside the tank to vent during filling to thus precool the radiation shield.

SUMMARY OF THE INVENTION

In order to achieve a cryogenic dewar that will result in no loss or minimum loss of product during storage at a user location, it has been discovered that a transient heat shield should be disposed between the inner and outer vessels in the vacuum space of the dewar. Furthermore, the transient heat shield should be constructed so that it can be put in heat exchange with the cryogenic liquid, vapor or supercritical fluid (individually and collectively referred to as cryogenic fluid) which is normally drawn off the bottom or top of the vessel so that as product is withdrawn, it cools the transient heat shield to prevent influx of heat into the inner vessel of the dewar. When the transient heat shield includes at least one thermal sink that is in heat exchange relationship with the withdrawal conduit, refrigeration of the transient heat shield is more adequately facilitated and a better product loss prevention device is effected. Alternatively at least one fluid thermal sink can be used in combination with the transient heat shield to achieve the same effect.

BRIEF DESCRIPTION OF THE DRAWING

FIG. 2 is an enlarged representation of the top portion of a cryogenic storage dewar according to the present invention.

DESCRIPTION OF THE PREFERRED EMBODIMENT

Figure 1:
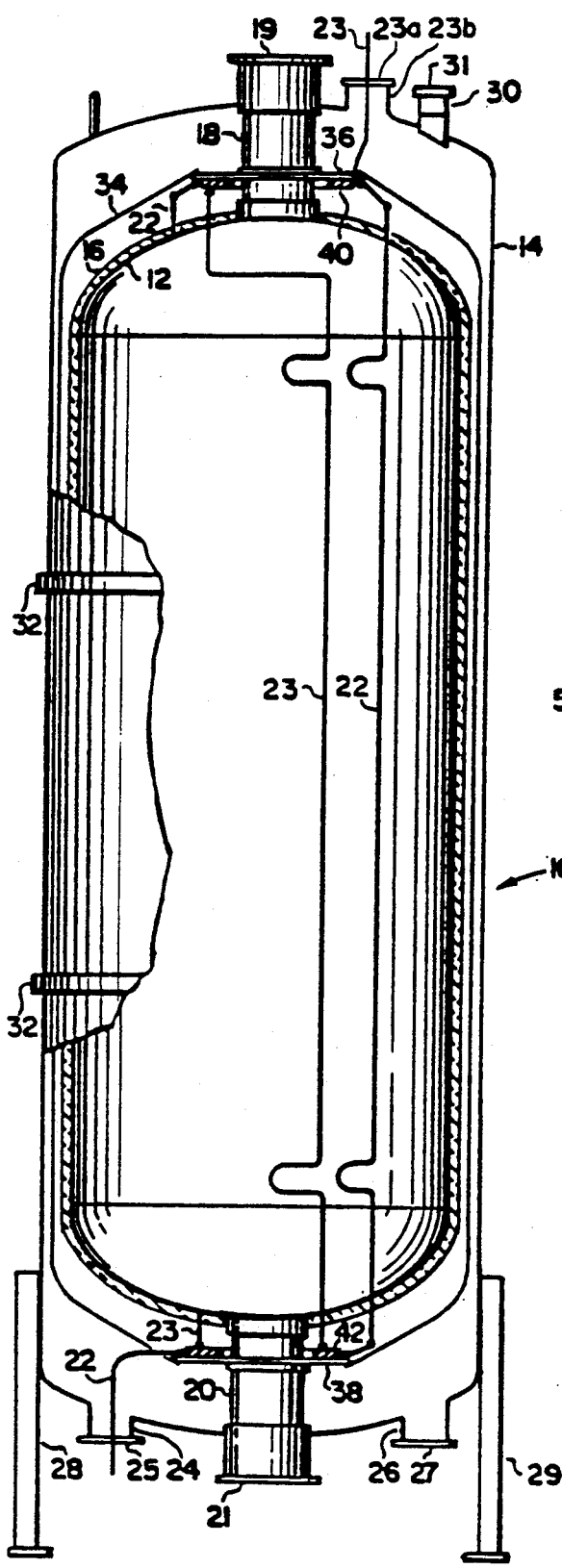
FIG. 1 is a schematic representation of a cryogenic storage dewar according to the present invention.

Referring to FIG. 1, there is shown a dewar 10 for storing cryogenic fluid of the type to which the instant invention is applicable. Such cryogenic storage dewars or customer stations 10 as they are known in the trade are used for holding a cryogenic fluid, e.g. nitrogen, oxygen, argon, helium or the like, in liquid form for use by a user or customer in their everyday operations. Customer stations such as 10 can be either portable or stationary.

The conventional dewar shown as 10 includes an inner vessel or tank 12 and an outer vessel or tank 14, the inner tank being covered by a suitable insulation such as a multi-layer composite of metal and plastic and supported in the outer shell 14 by means of tubes or trunions 18 and 20 closed by suitable vacuum tight covers 19 and 21, respectively. Inner tank 12 includes a fluid conduit 22 which passes outwardly of the outer tank 14 to deliver cryogen vaporized inside the inner vessel to the point of use. Inner tank 12 can also utilize a fluid conduit 23 which passes outwardly of its outer tank 14 to utilize liquid cryogen in the practice of the invention. In the event the customer wishes to withdraw liquid for client use, a suitable withdrawal device which does not refrigerate the transient shield, is placed at the bottom of the tank (not shown) as is well known in the art.

Outer tank 14 includes lower passages 24 and 26 closed by suitable covers 25 and 27 to permit conduit 22 and instrumentation (not shown) to be passed inside the outer vessel 14 to the inner vessel 12. Outer vessel 14 includes an upper passage 23b closed by suitable cover 23a to permit conduit 23 to be passed inside the outer vessel 14 to the inner vessel 12 and a suitable relief conduit 30 and a relief valve 31 associated therewith. The storage dewars or tanks of this type generally provide for evacuation of the space between the inner tank 12 and the outer tank 14 to thus provide additional insulation and slow down heat infiltration from the atmosphere to the inner tank 12. Outer tank 14 can include a plurality of supports shown generally as 28 so that the vessel can be installed in a vertical position, thus providing for vaporized cryogen to accumulate near the top of the inner vessel 12. A series of stiffening rings 32 can be included around the circumference of outer tank 14 depending upon the capacity of the dewar 10. Dewar 10 can also be constructed for horizontal installation as is well known in the art.

According to the present invention at least one transient heat shield 34 which is fabricated from a suitable conductive material such as aluminum or copper is disposed in the vacuum space between the inner vessel 12 and the outer vessel 14. Heat shield 34 is attached to a pair of high heat conductive supports 36 and 38 which are in turn fastened to the inner vessel supports 18 and 20 which are low heat conductive (e.g. fiberglass). As shown in FIG. 2 heat shield 34 preferably is covered by a layer of conventional multi-layer insulation. Disposed on supports 36 and 38 are a pair of thermal sinks 40 and 42 which are fabricated from a metal having a high specific heat and high thermal conductivity (e.g. aluminum or copper) and preferably, but not necessarily of a greater mass than the transient thermal shield 34. Thermal sinks 40, 42 can be fabricated from individual segments or cast as a solid piece depending upon the type of dewar being fabricated. The vapor withdrawal conduit 22 and liquid conduit 23 communicating with the interior of inner vessel 12 are fixed in thermal exchange relationship with the thermal sinks 40 and 42, respectively, and the heat shield 34 prior to exiting outer vessel 14 through passages 24 and 23b, respectively.

Referring to FIG. 2, the transient heat shield 34 can have disposed on its outer surface insulation 35 of the same type used to insulate the inner vessel 12 and shown as 16. As shown in FIG. 2, thermal sink 40 can be fastened to support 36 as by bolting shown generally as 41.

Additional conduit 44 leading to the normal safety relief device (not shown) is fixed in heat exchange relationship with the thermal sinks 40, 42 to derive additional refrigeration, in case fluid flow occurs through this conduit because of overpressurization of inner vessel 12.

The tank according to FIGS. 1 and 2 utilizes the refrigeration capacity of the stored cryogenic fluid in the form of vaporized gas, liquid cryogen, or supercritical fluid to thus intercept heat leak into the container to thus prolong the storage time of the liquid cryogen and reduce losses due to vapors passing into the atmosphere through the normal relief valve system (not shown). The cryogenic fluid (e.g. liquid cryogen, cold gas or supercritical fluid) drawn out of the tank to be warmed up and used by the customer in gaseous form will provide refrigeration to the transient heat shield 34 by lowering of its temperature. The refrigeration is stored in the transient heat shield 34 and the thermal sinks 40 and 42 to intercept heat leaking into the container when cold fluid flow through the withdrawal conduits 22, 23 has been terminated. In intercepting heat leak into the container, thermal energy level of the transient shield 34 will increase thus depleting the stored refrigeration capacity of the transient heat shield 34. When liquid cryogen, cold gas or supercritical fluid is withdrawn at a subsequent time, the flow of fluid will again lower the thermal energy level of the transient shield 34 and thus refrigeration will be accumulated in the shield and the thermal sinks (34, 40 and 42). Interception of the heat leak by the transient shield 34 when the fluid flow is absent reduces the net heat transfer into the cryogen container and thus prolongs storage time and saves energy.

For example, in a conventional dewar or storage tank such as shown in FIG. 1, without the transient heat shield 34 used to store 1500 gallons of liquid hydrogen and unless the user withdraws approximately 80,000 ft$^3$ per month from the vapor space in the vessel, the tank will, after reaching the set relief pressure due to warming of the stored cryogen, continuously vent through its normal venting system 44 and thus product will be lost. Taking this tank and installing a transient heat shield according to the present invention gives the customer the option of withdrawing less than 20,000 ft$^3$ per month of vapor in an intermittent pattern over the month without loss of vapor through the normal venting apparatus. Thus while in both instances the user can vary his demand over the month, the necessary demand in order to prevent loss of any stored product is reduced from approximately 80,000 ft$^3$ a month to less than 20,000 ft$^3$ a month, thus giving the user more flexibility in his product usage. A particularly effective transient heat shield according to the present invention can be fabricated from aluminum having a thickness less than 0.125". The thermal sinks 40, 42 should each have a total weight of approximately 150 pounds in order to provide additional storage capacity of the refrigeration obtained from the withdrawn vapor.

The solid thermal sinks 40 and 42 extract and store refrigeration from the exiting cryogenic fluid through heat transfer and by lowering of their enthalpy. When the cryogen flow stops, temperature of the transient heat shield 34 will rise due to the heat leaking into the tank or dewar 10. The solid thermal sinks 40 and 42 will absorb a major part of this heat leak through the release of stored refrigeration themselves and to the heat shield 34, thus reducing the net heat leak into the stored cryogen. Different materials can be used for the transient heat shield and solid thermal sinks in order to optimize performance of the transient heat shield system. The solid thermal sinks 40 and 42 can be positioned at appropriate locations to optimize the design and operation of the tank 10 and can result in utilization of thin shielding to provide the optimum refrigeration transfer. Since the solid thermal sink material can be positioned at various locations, it can be more efficiently cooled by the cryogenic liquid, vaporized cryogen or supercritical fluid, particularly when fluid is drawn off at a high rate for only a short period of time. Thermal gradients between the fluid and most remote parts of the solid thermal sink can be minimized, thus improving the extraction and storage of refrigeration.

It is also possible to utilize more than one transient heat shield and thermal sink combination to intercept more heat leak into the dewar 10.

Figure 3:
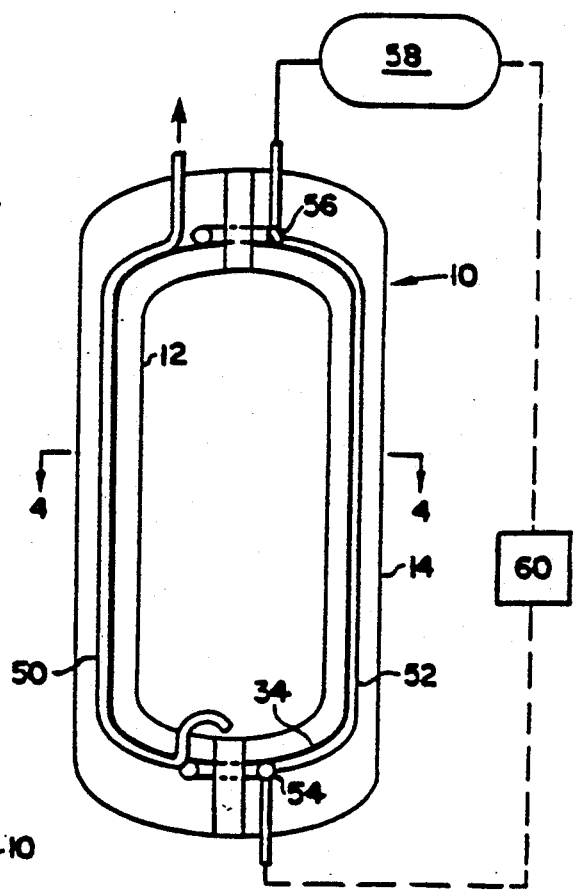
FIG. 3 is a schematic representation of an alternate embodiment of the present invention.
Figure 4:
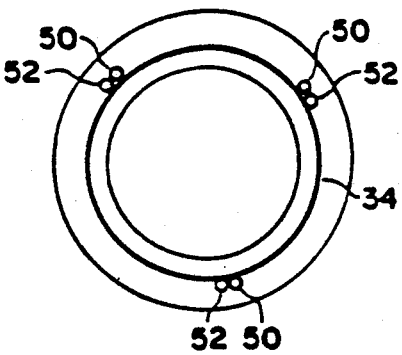
FIG. 4 is a section taken along lines 4—4 of FIG. 3.

Referring to FIGS. 3 and 4, there is shown a schematic representation of the tank 10 containing the inner vessel 12 and the outer vessel 14 to which is applied a fluid sink system. The fluid sink system is particularly adapted to the transient heat shield 34 where solid thermal sinks would of necessity be too large for proper placement and support or where it is impractical or inconvenient to store the required refrigeration in transient heat shields with solid thermal sinks.

The fluid thermal sink consists in one application, of the withdrawal conduit 50 as it exits the tank being manifolded to provide a plurality of conduits which can be disposed around the transient heat shield 34 disposed in heat exchange relationship with transient heat shield 34 and a number of fluid thermal sink conduits 52 which are connected to inlet manifolds 54 and outlet manifolds 56, respectively. An equal number of fluid thermal sink conduits 52 is preferred. Alternatively, or in parallel with the use of withdrawal conduit 50 another conduit (not shown) adapted to withdraw cold gas or supercritical fluid from inner vessel 12 such as shown in connection with the device of FIG. 1 can also be included. The fluid thermal sink manifolds 54 and 56 are used to provide a continuous fluid thermal sink circulation path such as shown in the drawing and includes a reservoir 58 and, if necessary, a circulating device 60. The fluid thermal sink system utilizes a reusable fluid, the particular fluid selected determined by the cryogen being stored in the dewar 10 and the operating limits of the temperature of the transient heat shield. For example, when the dewar 10 is used to store liquid hydrogen the fluid thermal sink fluid can be nitrogen. While FIG. 3 shows the use of a circulating device 60, the system can be designed so that no additional energy via the use of a circulating device is necessary.

In operation, the system of FIGS. 3 and 4 extracts refrigeration from the cryogen exiting the dewar 10 through conduits 50. The refrigeration is stored in the fluid thermal sink (52, 54, 56). By selecting appropriate fluids with high specific heats or high latent heats, considerable refrigeration may be stored and released when there is no cryogen flow out of the storage tank and the transient shield starts to warm up. The fluid sink fluid may be stored in a reservoir 58 inside or outside the vacuum jacket of the dewar 10 depending upon its temperature of operation. If a liquid is used as the fluid thermal sink fluid, it may be cooled and frozen. In cases where compressed gas is being used as the fluid thermal sink fluid, it may be stored outside or inside the vacuum jacket depending upon its enthalpy level. Compressed gases may be cooled, condensed or frozen. In all cases where freezing is involved, sufficient consideration must be given during the design stage to behavior of fluid properties during freezing and thermal performance of the transient shield. In cases where the physical size of the transient shield system necessitate external means for circulating the fluid thermal sink fluid, pumps or compressors may be used.

Having thus described our invention what is desired to be secured by Letters Patent in the United States is set forth in the appended Claims.

1. In a dewar for storing or transporting cryogenic fluid of the type containing an outer vessel and an inner vessel disposed therein, said inner vessel including means to admit and withdraw cryogenic fluid from the interior therefore, and insulation between said inner and outer vessels, the improvement comprising:

disposing at least one metallic transient heat shield between said inner and outer vessels, said heat shield containing means to retain refrigeration, said means to retain refrigeration adapted to be contacted by cryogenic fluid as it is withdrawn from said inner vessel said means to retain refrigeration also includes at least one thermal sink in heat exchange with said cryogenic fluid withdrawal means.

2. A dewar according to claim 1 wherein said thermal sink is a solid metal having high specific heat and high thermal conductivity.

3. A dewar according to claim 2 wherein said metal is aluminum.

4. A dewar according to claim 2 wherein said metal is copper.

5. A dewar according to claim 1 wherein said metallic transient heat shield is in direct heat exchange with a fluid thermal sink.

6. A dewar according to claim 5 said fluid thermal sink includes a plurality of conduits in heat exchange with said transient heat shield and stored fluid withdrawal means, said conduits include means for circulating a heat extracting fluid through said conduits.

7. A dewar according to claim 6 wherein said heat extracting fluid is selected from the group of fluids having high specific heat or high latent heat.

8. A dewar according to claim 7 wherein said heat extracting fluid is selected from the group consisting of helium, hydrogen, nitrogen, argon, oxygen, neon and mixtures thereof.

9. A dewar according to claim 7 wherein there is a vacuum space between said inner and outer vessels and said heat extracting fluid is stored in said vacuum space.

10. A method for preventing loss of cryogen stored in a vacuum jacketed dewar due to infrequent withdrawal causing the stored cryogen to warm and vaporize due to heat infiltration into said dewar comprising the steps of:

disposing at least one metallic transient heat shield in said vacuum jacket containing means to retain refrigeration produced by said refrigeration retaining means being disposed in heat exchange relationship with cryogenic fluid as it is withdrawn from said dewar for use.

11. A method according to claim 10 wherein at least one solid thermal sink is disposed in heat exchange with said transient heat shield and vaporized cryogen, liquid, or supercritical fluid in fluid withdrawal means.

12. A method according to claim 10 wherein a fluid thermal sink is disposed heat exchange with said transient heat shield.

* * * * *